United States Patent
Weber et al.

(10) Patent No.: US 10,027,115 B2
(45) Date of Patent: Jul. 17, 2018

(54) POWER WIRING DEVICE

(71) Applicant: TYCO ELECTRONICS CORPORATION, Berwyn, PA (US)

(72) Inventors: Ronald Martin Weber, Annville, PA (US); Christopher George Daily, Harrisburg, PA (US); Matthew Edward Mostoller, Hummelstown, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 363 days.

(21) Appl. No.: 14/832,736

(22) Filed: Aug. 21, 2015

(65) Prior Publication Data

US 2017/0054292 A1  Feb. 23, 2017

(51) Int. Cl.
| | | |
|---|---|---|
| *H02J 3/00* | (2006.01) | |
| *H02G 3/16* | (2006.01) | |
| *H01R 4/48* | (2006.01) | |
| *H01R 13/66* | (2006.01) | |
| *H01R 103/00* | (2006.01) | |
| *H01R 12/51* | (2011.01) | |
| *H01R 24/78* | (2011.01) | |

(52) U.S. Cl.
CPC ............. *H02J 3/00* (2013.01); *H01R 4/4818* (2013.01); *H01R 13/6658* (2013.01); *H02G 3/16* (2013.01); *H01R 12/515* (2013.01); *H01R 24/78* (2013.01); *H01R 2103/00* (2013.01)

(58) Field of Classification Search
CPC ........................................................ H02J 3/00
USPC .......................................................... 307/31
See application file for complete search history.

(56) References Cited

U.S. PATENT DOCUMENTS

| | | | | |
|---|---|---|---|---|
| 4,001,647 A | * | 1/1977 | Klein | ...................... H01H 71/04 335/18 |
| 6,309,248 B1 | * | 10/2001 | King | .................. H01R 13/7135 361/42 |
| 2006/0160405 A1 | | 7/2006 | Fabian et al. | |

(Continued)

FOREIGN PATENT DOCUMENTS

| | | |
|---|---|---|
| DE | 202004007077 U1 | 6/2005 |
| EP | 1168505 A2 | 1/2002 |
| EP | 1816706 A1 | 8/2007 |

OTHER PUBLICATIONS

International Search Report, International Application No. PCT/US2016/046999, International Filing Date, dated Aug. 15, 2016.

*Primary Examiner* — Joseph Chang (57) ABSTRACT

A power wiring device includes a front housing having a power component at a user interface and a rear housing having a wire interface. The front and rear housings define a cavity. Control electronics are received in the cavity and include a circuit board and a controller coupled to the circuit board. The controller has control circuitry for controlling a power function of the power wiring device. The power component is coupled to the circuit board and affected by the power function. A plurality of power terminals are coupled to the circuit board. The power terminals each have a base, circuit board contacts extending from the base and being terminated to the circuit board, and wire contacts extending from the base. The wire contacts have quick connect interfaces for direct, quick connection to corresponding wires of building wiring.

20 Claims, 5 Drawing Sheets

(56) References Cited

U.S. PATENT DOCUMENTS

2011/0076900 A1  3/2011  Keswani et al.
2012/0056697 A1* 3/2012  Ku .................... H01H 77/06
                                            335/6

\* cited by examiner

POWER WIRING DEVICE

BACKGROUND OF THE INVENTION

The subject matter herein relates generally to power wiring devices.

Conventional power wiring devices for homes or businesses, such as power outlets, lighting switches, dimmers, and the like, are typically provided with screw terminals along sides thereof for attachment to building wiring. The screw terminals are integrated with the electrical component of the power wiring device, such as to the AC power receptacles, the switch, and the like. Such conventional power wiring devices are strictly electrical in nature without any electronics enclosed for affecting the power control of the power wiring devices.

Recently, the power wiring devices have been designed as "smart" devices with the addition of electronics into the power wiring devices for additional control capability, such as for remote control, power management, and the like. For example, circuit boards with integrated electronic components and circuits have been provided in the housing of the power wiring devices. However, the addition of such electronics add to the size of the power wiring devices due to the density of the electronics, causing the power wiring devices to push the limits of the size of standard and existing wall wiring boxes. The added size of the power wiring devices has made it impractical or impossible to attach building wiring to screw terminals as the sides of the power wiring devices are pushed to the width of the wall wiring box. As a result, typical smart power wiring devices for homes and businesses are supplied with wire leads coming out of the housing of the smart power wiring device, which are then spliced into the building wiring, such as using wire nuts. During manufacture of the device, the wires leads are hand soldered into the circuit board inside the housing, which is a time consuming and labor intensive manufacturing process, making such smart power wiring devices expensive to manufacture. Furthermore, the additional length of wire leads and the corresponding wire nuts or push nuts and the added size of the power wiring device make the wall wiring box into which the assembly is installed very cramped. Additionally, when the dedicated wire leads and building wiring wires are pressed into the wall wiring box, the wires or wire leads are often pinched, which could pose a safety hazard.

A need remains for a power wiring device that overcomes some or all of the problems associated with other power wiring devices incorporating control electronics satisfying the limited space constraints.

BRIEF DESCRIPTION OF THE INVENTION

In one embodiment, a power wiring device is provided including a front housing having a power component at a user interface and a rear housing having a wire interface. The front and rear housings define a cavity. Control electronics are received in the cavity and include a circuit board and a controller coupled to the circuit board. The controller has control circuitry for controlling a power function of the power wiring device. The power component is coupled to the circuit board and affected by the power function. A plurality of power terminals are coupled to the circuit board. The power terminals each have a base, circuit board contacts extending from the base and being terminated to the circuit board, and wire contacts extending from the base. The wire contacts have quick connect interfaces for direct, quick connection to corresponding wires of building wiring.

In another embodiment, a power wiring device is provided including a front housing having a power component at a user interface and a rear housing having a wire interface with an opening through the rear housing at the wire interface. The front and rear housings defining a cavity. Control electronics are received in the cavity and include a circuit board and a controller coupled to the circuit board. The controller has control circuitry for controlling a power function of the power wiring device. The power component is coupled to the circuit board and affected by the power function. A power connector is coupled to the circuit board. The power connector passes through the opening in the rear housing and is positioned at the wire interface for receiving wires of building wiring. The power connector includes a power connector housing holding a plurality of power terminals. The power terminals are coupled to the circuit board. The power terminals have wire contacts including quick connect interfaces for direct, quick connection to corresponding wires of the building wiring.

DETAILED DESCRIPTION OF THE INVENTION

Figure 1:
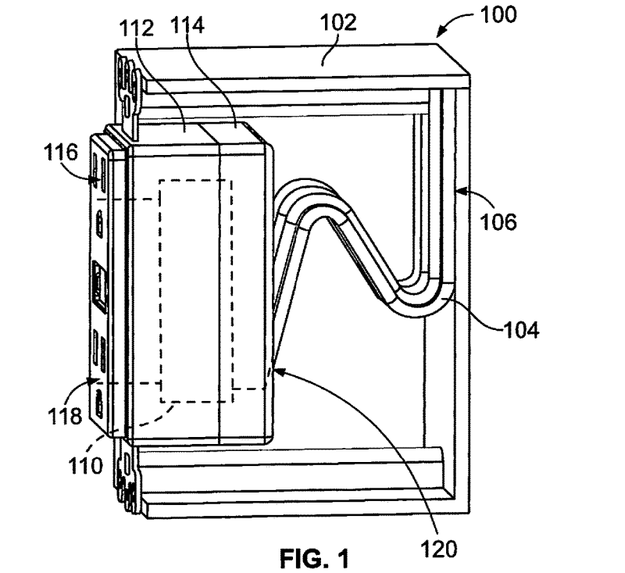
FIG. 1 illustrates a power wiring device formed in accordance with an exemplary embodiment.

FIG. 1 illustrates a power wiring device 100 that is formed in accordance with an exemplary embodiment. The power wiring device 100 is received in a wall box 102 and is directly terminated to wires 104 of building wiring 106 within the wall box 102. The building wiring 106 enters the wall box 102 and is directly terminated to the power wiring device 100 at quick connect interfaces with the power wiring device 100. For example, the wires 104 may be directly poked into the power wiring device 100. In other embodiments, the wires 104 may be electrically connected to the power wiring device 100 using insulation displacement contact (IDC) connections.

Having the wires 104 directly terminated to the power wiring device 100 eliminates the need for device leads that extend from the power wiring device 100 and thus eliminates the need for wiring nuts to connect such leads to the building wiring 106. Eliminating device leads and wiring nuts, within the wall box 102, allows more space within the standard wall box 102 for the power wiring device 100 and reduces the risk of damaging the building wiring 106 when the wires 104 and powering wiring device 100 are pushed into the wall box 102 during installation. The termination axis of the wires 104 allow the wires 104 to have a nice wire dress within the wall box 102 as opposed to being bunched into the wall box 102 with wire nuts and excessive lengths of device leads as is typical with conventional power wiring devices. For example, the wires 104 may accordion into the wall box 102.

The power wiring device 100 has control electronics 110 for controlling power functions of the power wiring device 100. The control electronics 110 have control circuitry for controlling the power functions of the power wiring device 100. For example, the control electronics 110 may make the power wiring device 100 programmable. The control electronics 110 may allow the power wiring device 100 to be remotely controlled. The control electronics 110 provide smart electronics or control of the power wiring device 100 which enhances functionality of the power wiring device 100 over conventional power wiring devices. Examples of electronically controlled power wiring devices include, but are not limited to, power outlets, on/off switches, dimmer switches, and other types of smart power wiring devices 100 which control the electrical power supply of the building wiring 106. The control electronics 110 are housed within an internal cavity of the power wiring device 100.

The power wiring device 100 includes a front housing 112 and a rear housing 114 that is coupled to the front housing 112. The front housing 112 has one or more power components 116 at a user interface 118. The power components 116 are user accessible and may be interfaced with by the user. For example, for a power outlet, the power components 116 include A/C power receptacles which may receive a conventional A/C plug. For power switches, the power components 116 may include an on/off power switch, a dimmer power switch, or another type of switch. The power wiring device 100 includes electrical components that affect operation or control of the power components 116. For example, the control electronics 110 may allow or restrict powering of the A/C power receptacles. The control electronics 110 may allow or restrict switching of the on/off switch or dimmer switch. The control electronics 110 may allow remote control or remote switching of the power components 116. The control electronics 110 may control other power functions of the power wiring device 100 in alternative embodiments.

In an exemplary embodiment, the rear housing 114 has a wire interface 120 to interface with the wires 104 of the building wiring 106. In an exemplary embodiment, the wire interface 120 is a quick connect interface allowing for direct quick connection of the wires 104 of the building wiring 106 to the power wiring device 100. For example, in an exemplary embodiment, the wire interface 120 may allow a poke-in connection for each of the wires 104. Other types of quick connections may be made in alternative embodiments, such as, insulation displacement connections. The wires 104 are directly terminated to the power wiring device 100 at the wire interface 120 and the power wiring device 100 does not include any pigtails or wire leads extending therefrom. Power supplied by the wires 104 to the power wiring device 100 is transmitted to the power components 116 through the control electronics 110. The control electronics 110 may affect the power transmission from the wires 104 to the power components 116.

Figures 2, 3, 4:
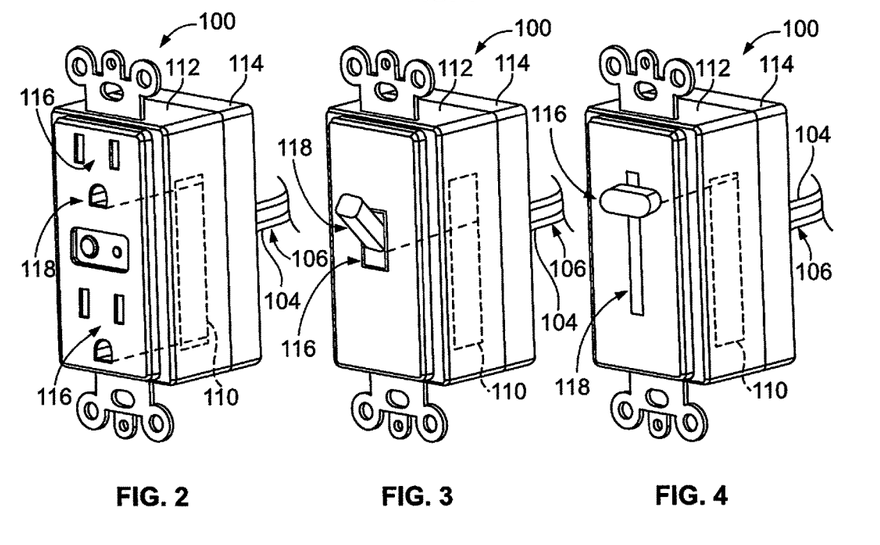
FIG. 2 is a front perspective view of the power wiring device configured as a power outlet.
FIG. 3 is a front perspective view of the power wiring device configured as an on/off power switch.
FIG. 4 is a front perspective view of the power wiring device configured as a dimmer power switch.

FIG. 2 is a front perspective view of the power wiring device 100 configured as a power outlet that shows the power components 116 as A/C receptacles configured to receive an A/C plug. FIG. 3 is a front perspective view of the power wiring device 100 configured as an on/off power switch showing the power components 116 as an on/off power switch. FIG. 4 is a front perspective view of the power wiring device 100 configured as a dimmer power switch showing the power components 116 as a dimmer power switch.

While the power components 116 and corresponding front housing 112 are different in each of the embodiments (shown in FIGS. 2-4) the rear housing 114 is the same in each embodiment. The front housings 112 are interchangeable with the rear housing 114. As such, the wire interface 120 (shown in FIG. 1) remains the same irrespective of the type of front housing 112 and power components 116 utilized with the power wiring device 100. As such, different types of user interfaces may be selectively and interchangeably used with the rear housing 114 of the power wiring device 100.

Figure 5:
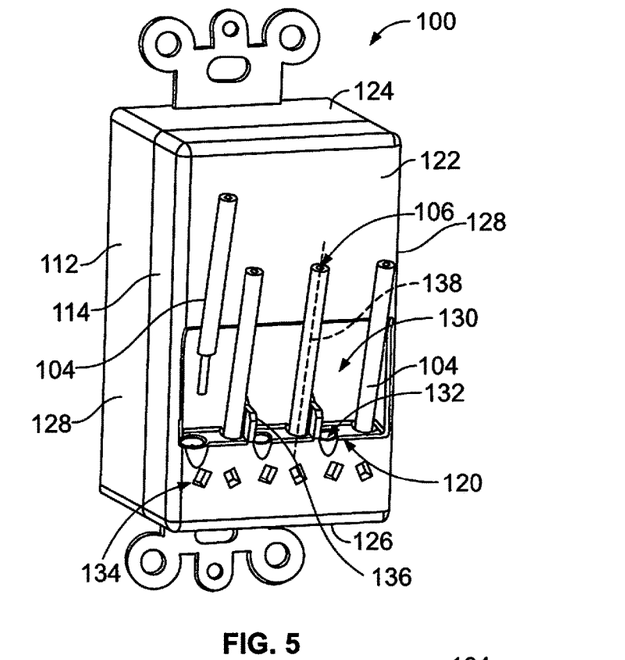
FIG. 5 is a rear perspective view of the power wiring device showing a wire interface.

FIG. 5 is a rear perspective view of the power wiring device 100 showing the wire interface 120 of the rear housing 114. The rear housing 114 includes a back wall 122 at the rear of the power wiring device 100. The power wiring device 100 also includes a top wall 124, a bottom wall 126, and side walls 128 extending between top and bottom walls 124, 126. The top wall 124, bottom wall 126, and side walls 128 may be at least partially defined by the front housing 112 and/or partially defined by the rear housing 114. In the illustrated embodiment, the power wiring device 100 has a generally box shaped profile having generally planar top and bottom walls 124, 126 and generally planar side walls 128 perpendicular to the top and bottom walls 124, 126. The power wiring device 100 may have other shapes in alternative embodiments.

The rear housing 114 includes a pocket 130 at the back wall 122. The wires 104 may be routed into the pocket 130 for direct termination to the power wiring device 100. The pocket 130 is shaped to receive the wires 104 and direct the wires 104 out of the power wiring device 100 at an angle transverse to the back wall 122. In an exemplary embodiment, the power wiring device 100 includes a plurality of wire channels 132 that receive corresponding wires 104 of the building wiring 106. The wires 104 may be pressed or poked into the wire channels 132 for termination to the power wiring device 100. In an exemplary embodiment, wire release channels 134 are provided in the back wall 122 for releasing the wires 104 from the wire channels 132. For example, a tool may be inserted into the wire release channels 134 to release the wires 104 from the wire channels 132.

Optionally, the rear housing 114 may include divider walls 136 that divide portions of the pocket 130 into different sections. For example, the divider walls 136 may separate wire channels 132 that receive power wires (e.g. black wires) from wire channels 132 that receive neutral wires (e.g. white wires) and/or from wire channels 132 that receive ground wire (e.g. green wires). Other wire channels 132 may be provided in alternative embodiments. For example, one or more wire channels 132 may be provided to receive data or signal wires of the building wiring 106 that transmit data or control signals for controlling the control electronics 110 (shown in FIG. 1). Optionally, the divider walls 136 may extend only partially along the back wall 122 within the pocket 130.

In an exemplary embodiment, the power wiring device 100 includes multiple wire channels 132 for each of the power, neutral, and ground wires. As such, the power wiring device 100 may electrically connect or daisy chain different power wires together. For example, some wires 104 may define power-in wires while other wires 104 define power-out wires that may be routed within the building, such as to another power wiring device 100. Power may be transmitted from the PI wires to the PO wires through direct connectors to indirectly, such as through the control electronics 110, such as through a circuit board of the control electronics 110. In the illustrated embodiment, the wire channels 132 are adjacent to each other near the bottom wall 126. However, in alternative embodiments, wire channels 132 may be provided in other locations. For example, the wire channels 132 may be provided near the top wall 124 in addition to, or in the alternative to, the wire channels 132 near the bottom wall 126.

The wire channels 132 and back wall 122 are oriented to allow the wires 104 to be angled naturally away from the power wiring device 100. For example, the wires 104 may extend at a partial upward angle from the power wiring device 100. Such orientation of the wires 104 reduces the risk of damage to the wires 104 when the power wiring device 100 is loaded into the wall box 102 (shown in FIG. 1). As such, the wire dress may be easier within the wall box 102 as compared to if the wires 104 were to extend straight rearward or outward from the rear housing 114. The wire channels 132 receive the wires 104 along wire receiving axes 138. In an exemplary embodiment, the wire receiving axes 138 are angled transverse to the back wall 122 of the rear housing 114. For example, the wire receiving axes 138 may be angled between approximately 10° and 20° from the back wall 122. The wire receiving axes 138 may be at any other angle in alternative embodiments, such as a 45° angle. In other various embodiments, the wire receiving axes 138 may be parallel to the back wall 122 or perpendicular to the back wall 122. The angle may be selected to allow easy loading of the wires 104 into the wire channels 132 while controlling the direction of the wires 104 to limit or reduce wire bunching or damage as the power wiring device 100 is loaded into the wall box 102.

Figure 6:
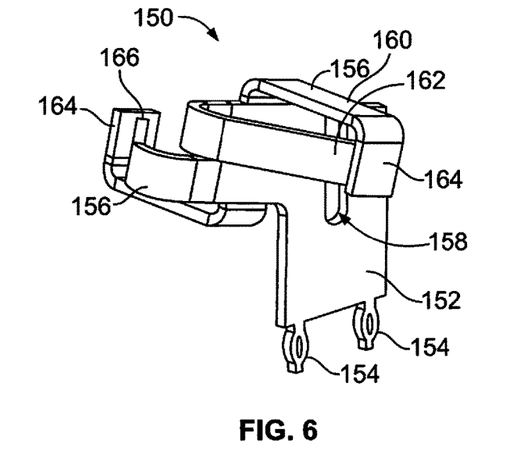
FIG. 6 is a side perspective view of a power terminal of the power wiring device formed in accordance with an exemplary embodiment.
Figure 7:
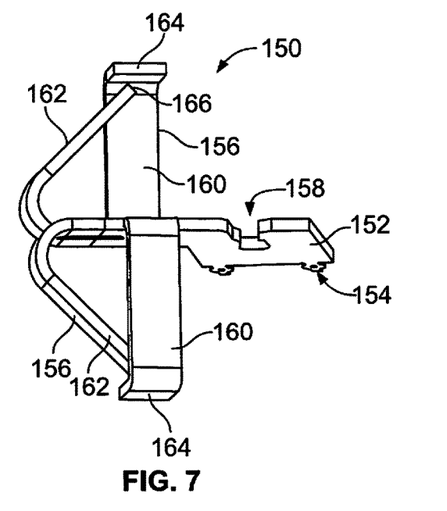
FIG. 7 is a top perspective view of the power terminal.

FIG. 6 is a side perspective view of a power terminal 150 formed in accordance with an exemplary embodiment. FIG. 7 is a top perspective view of the power terminal 150. The power terminal 150 is configured to be loaded into the power wiring device 100 (shown in FIG. 1) to create a direct electrical connection between the power wiring device 100 and the corresponding wire 104 of the building wiring 106 (both shown in FIG. 1).

The power terminal 150 includes a base 152, one or more circuit board contacts 154 extending from the base 152, and one more wire contacts 156 extending from the base 152. In an exemplary embodiment, the power terminal 150 is a stamped and formed terminal having the base 152, the circuit board contacts 154, and the wire contacts 156 stamped from a common blank or sheet for metal material and formed into a predetermined shape. The power terminal 150 is manufactured from a conductive material, such as metal, and defines an electrical path for the power between the wire contacts 156 and the circuit board contacts 154. In an exemplary embodiment, the base 152 includes a slot 158. The slot 158 may be used to secure the power terminal 150 within the power wiring device 100, as described in further detail below.

The circuit board contacts 154 define an electrical interface with the control electronics 110 (shown in FIG. 1). The wire contacts 156 define an electrical interface with the wires 104 of the building wiring 106. In the illustrated embodiment, the circuit board contacts 154 are compliant pins, such as eye-of-the-needle pins, configured to be press-fit to a circuit board of the control electronics 110. Other types of circuit board contacts 154 may be provided in alternative embodiments, such as soldered tails, spring beams, and the like.

In the illustrated embodiment, the wire contacts 156 are poke-in wire contacts defining a poke-in interface for the wires 104. Each wire contact 156 includes a poke-in arm 160 and a poke-in beam 162 adjacent to the poke-in arm 160. The poke-in beam 162 is deflectable and is configured to capture the corresponding wire 104 between the poke-in arm 160 and the poke-in beam 162 such that the wire contact 156 has multiple contact points with the wire 104 of the building wiring 106. The poke-in beam 162 is angled relative to the poke-in arm 160 and is configured to be deflected away from the poke-in arm 160 to allow the wire 104 to be positioned therebetween. For example, the poke-in arm 160 includes a tab 164 spaced apart from the base 152. The poke-in beam 162 is folded over such that a distal end 166 of the poke-in beam 162 faces the tab 164.

The wire 104, such as the stripped wire end, is configured to be received in the space between the tab 164 and the distal end 166 of the poke-in beam 164. The poke-in beam 162 may be deflected inward towards the base 152, away from the tab 164, when the wire 104 is coupled thereto. An edge of the poke-in beam 162 at the distal end 166 may dig into the wire 104 to capture the wire 104 in the wire contact 156. In an exemplary embodiment, the poke-in beam 162 is releasable to allow the wire 104 to be released from the wire contact 156. Residual force resulting from the poke-in beam deflection causes the distal end 166 to be forcibly engaged with the bare metallic wire 104.

In the illustrated embodiment, the power terminal 150 includes a first wire contact 156 positioned on a first side of the base 152 and a second wire contact 156 positioned on an opposite second side of the base 152. The wire contacts 156 extend in opposite directions. The first and second wire contact 156 are integral or common with the power terminal 150 such that a first wire 104 poked into the first wire contact 156 may be electrically connected to a second wire 104 plugged into the second wire contact 156, which electrically commons the wires 104. Other configurations are possible in alternative embodiments.

Figure 8:
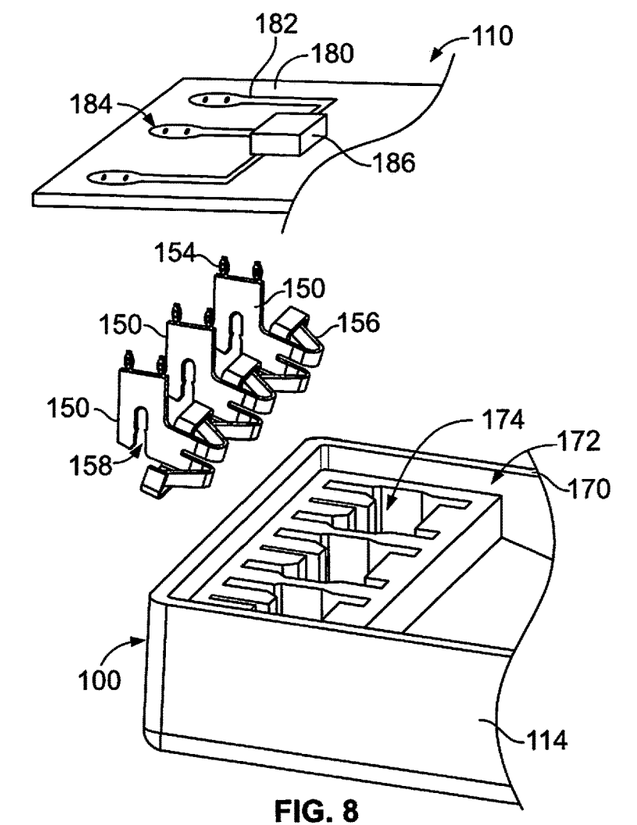
FIG. 8 is an exploded view of a portion of the power wiring device.
Figure 9:
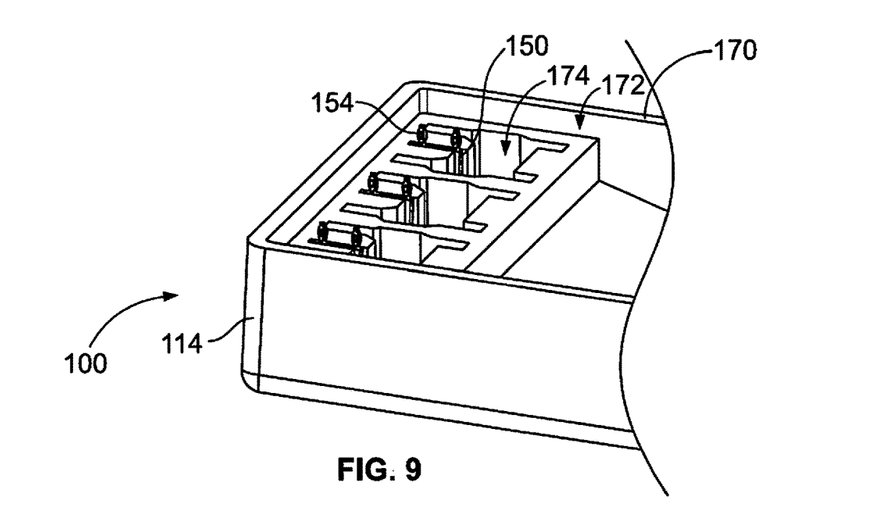
FIG. 9 is a perspective view of a portion of the power wiring device.

FIG. 8 is an exploded view of a portion of the power wiring device 100 showing a plurality of power terminals 150 poised for loading in the rear housing 114 and showing the control electronics 110 poised for mating with the power terminals 150. FIG. 9 is a perspective view of a portion of the power wiring device 100 showing a plurality of power terminals 150 loaded into the rear housing 114. The rear housing 114 is manufactured from a dielectric material, such as a plastic material. Optionally, the rear housing 114 may be molded, such as injection molded. The rear housing 114 has a front end 170 that defines an interior cavity 172. The front end 170 is configured to face the front housing 112 (shown in FIG. 1). Optionally, some or all of the control electronics 110 may be received in the interior cavity 172.

The rear housing 114 includes a plurality of terminal channels 174 that receive corresponding power terminals 150. The power terminals 150 may be held in corresponding terminal channels 174, such as by an interference fit. For example, a portion of the rear housing 114 may fit in the slot 158 and barbs on opposite sides of the slot 158 may dig into the rear housing. Dielectric material of the rear housing 114 may be positioned between adjacent terminal channels 174 to electrically isolate power terminals 150 from each other. Optionally, the terminal channels 174 are open to corresponding wire channels 132 (shown in FIG. 5) such that the wires 104 may be poked into the wire channels 132 and terminated to corresponding power terminals 150 in the terminal channels 174.

In an exemplary embodiment, the control electronics 110 include a circuit board 180. The circuit board 180 may be at least partially received in the interior cavity 172. Alternatively, or additionally, the circuit board 180 and control electronics 110 may be received in a corresponding interior cavity of the front housing 112. The circuit board 180 includes conductors 182 forming control circuitry 184 of the circuit board 180. The circuit board 180 is coupled to the rear housing 114 and/or the rear housing 114 is coupled to the circuit board 180 such that the circuit board contacts 154 are electrically connected to corresponding conductors 182. For example, the conductors 182 may include plated vias that receive the circuit board contacts 154. The power terminals 150 are held in the terminal channels 174 such that the circuit board contacts 154 extend into the interior cavity 172 for mating with the circuit board 180. Optionally, the circuit board 180 may be pressed onto the power terminals 150 as the circuit board 180 is loaded into the interior cavity 172. The power terminals 150 may be terminated to the circuit board 180 by other means or processes in other alternative embodiments. For example, the power terminals 150 may be soldered to the circuit board 180 or may be electrically connected to the circuit board 180 at separable interfaces, such as using spring beams. The power terminal 150 may be transmitted to the circuit board 180 prior to loading the circuit board 180 and power terminal 150 into the interior cavity 172 terminal channels 174.

In an exemplary embodiment, the control electronics 110 include a controller 186 coupled to the circuit board 180. The controller 186 is electrically connected to one or more of the conductors 182. The controller 186 and conductors 182 define the control circuitry 184 for controlling one or more power functions of the power wiring device 100. The power components 116 are electrically connected to the circuit board 180, such as to the control circuitry 184. The controller 186 controls the power functions of the power components 116. The controller 186 may include power switching devices, such as relays. The controller 186 may include a microprocessor that processes data or signals from the conductors 182. The controller 186 may include a memory for storing the data from the conductors 182. The controller 186 may include a communication device, such as a transmitter/receiver for communicating data to/from other components. Such data may be communicated wirelessly or may be communicated through the conductors 182. The data may be communicated along the power wires, or along dedicated signal or data wires terminated to the power wiring device 100. The controller 186 may output data or signals to the conductors 182, which may be transmitted along the conductors 182 to other wires 104. The controller 186 may include various electronic components for controlling power functions of the power wiring device 100. The controller 186 may control power between the power terminals 150 and the power components 116 (shown in FIG. 1). As such, the controller 186 affects the operation of the power wiring device 100, such as by allowing/restricting power to/from the power components 116.

Figure 10:
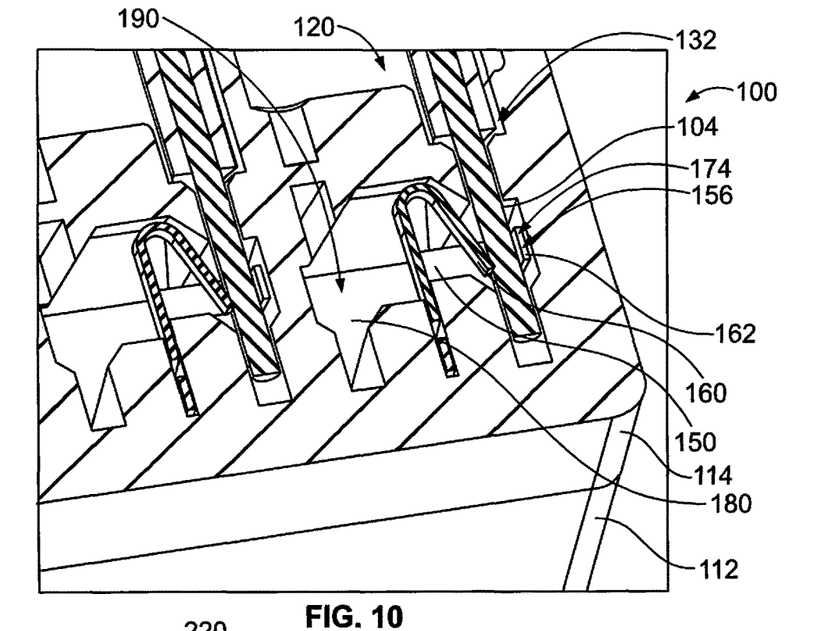
FIG. 10 is a rear, partial sectional view of a portion of the power wiring device.

FIG. 10 is a rear, partial sectional view of a portion of the power wiring device 100. The rear housing 114 is shown coupled to the front housing 112 with the circuit board 180 positioned in a cavity 190 defined between the rear housing 114 and the front housing 112. The cavity 190 may be at least partially defined by the interior cavity 172 of the rear housing 114 and at least partially defined by an interior cavity of the front housing 112.

The power terminals 150 are shown received in corresponding terminal channels 174. Wire contacts 156 are illustrated in FIG. 10 with wires 104 poked into the wire contacts 156. For example, ends of the wires 104 are loaded through corresponding wire channels 132 into the terminal channels 174. The power terminals 150 are arranged in the terminal channels 174 to receive corresponding wires 104. The wires 104 are poked through the wire contacts 156 such that the wires 104 are captured between the poke-in beams 162 and the poke-in arms 160. The wires 104 may be held in the wire contacts 156 by the poke-in beams 162 engaging the sides of the wires 104. The power terminals 150 define a direct electrical path between the wires 104 of the building wiring 106 and the control electronics 110 of the power wiring device 100. The wires 104 may be quickly and easily terminated to the power terminals 150. The power terminals 150 allow electrical connection between the wires 104 of the building wiring 106 and the control electronics 110 without the need for extraneous device leads extending from the rear housing 114 or wiring nuts used to terminate the device leads to the building wiring. As such, additional room is provided in the wall box 102 (shown in FIG. 1) leading to easier installation and reduced risk of damaging the building wiring 106.

Figure 11:
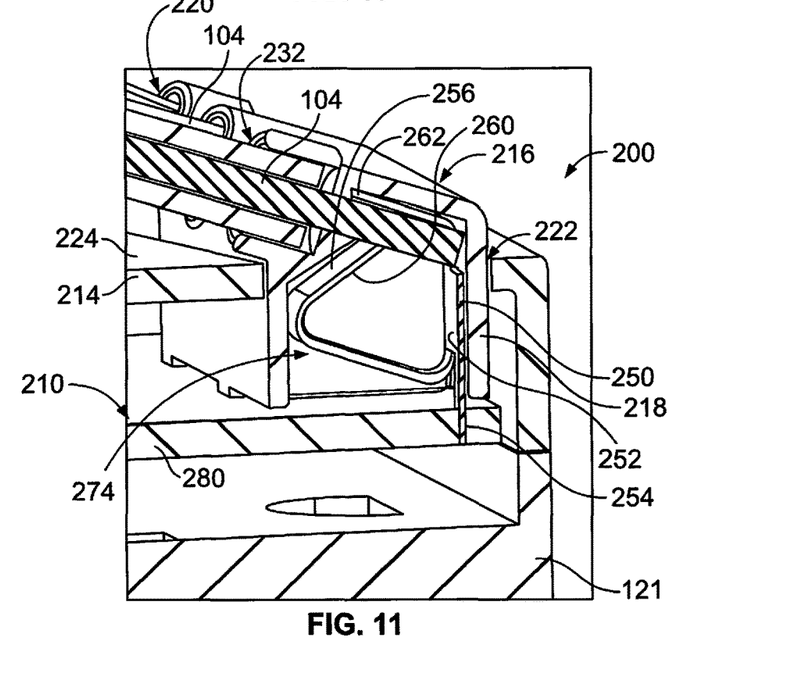
FIG. 11 is a partial sectional view of a power wiring device formed in accordance with an exemplary embodiment.
Figure 12:
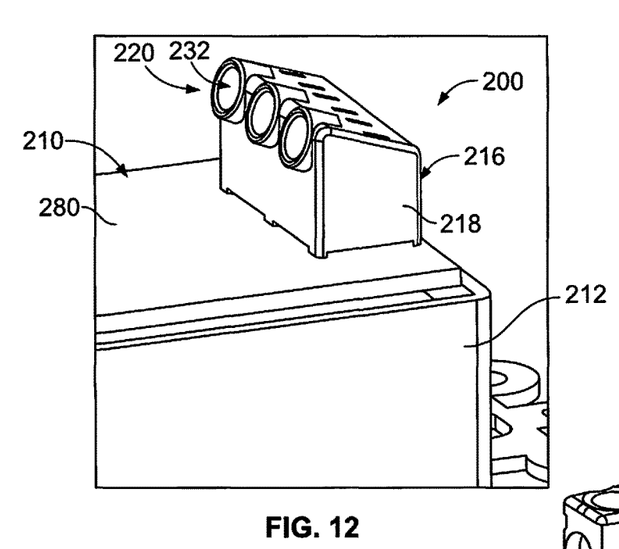
FIG. 12 is a rear perspective view of a portion of the power wiring device shown in FIG. 11.

FIG. 11 is a partial sectional view of a power wiring device 200 that is formed in accordance with an exemplary embodiment. FIG. 12 is a rear perspective view of a portion of the power wiring device 200. The power wiring device 200 is similar to the power wiring device 100. However, the power wiring device 200 includes an alternative interface between wires 204 and control electronics 210 of the power wiring device 200. The power wiring device 200, similar to the power wiring device 100, allows a direct power path between the wires 204 and the control electronics 210. The wires 204 may be quickly and directly connected to the power wiring device 200. The power wiring device 200 provides a connectorized connection to the building wiring 106 using power terminals 250 terminated to a circuit board 280 of the control electronics 210.

The power wiring device 200 includes a front housing 212 and a rear housing 214. The rear housing 214 is removed in FIG. 12 to illustrate the internal components of the power wiring device 200. The power wiring device 200 includes a power connector 216 mounted to the circuit board 280. The power connector 216 includes a plurality of the power terminals 250 held in a power connector housing 218. The power connector 216 defines a wire interface 220 having a plurality of wire channels 232 for receiving corresponding wires 204. In contrast to the power wiring device 100, where the power terminals 150 are held by the rear housing, the power wiring device 200 includes the power connector 216 which holds the power terminals 250 and is terminated to the circuit board 280. The rear housing 214 includes an opening 222 in a back wall 224 thereof The power connector 216 extends through the opening 222 and is accessible behind the rear housing 214 for interfacing with the wires 204. For example, the wire channels 232 are positioned exterior of the rear housing 214 for receiving the wires 204.

The power terminals 250 are held in corresponding terminal channels 274 of the power connector housing 218. The wires 204 are poked into the wire channels 232 to interface with the power terminals 250. In an exemplary embodiment, the power terminals 250 each include a base 252, a circuit board contact(s) 254 extending the base 252 for electrical connection to the circuit board 280, and a wire contact(s) 256 extending from the base 252. The wire contact 256 includes a deflectable poke-in beam 262 that captures the wire 204. Optionally, the wire 204 may be captured between the poke-in beam 262 and a poke-in arm 260. In other various embodiments, the power wiring device may include multiple power connectors 216 terminated to the circuit board and extends though corresponding openings in the back wall. Power terminals 250 of the power connector 216 are electrically connected through the circuit board 280.

Figure 13:
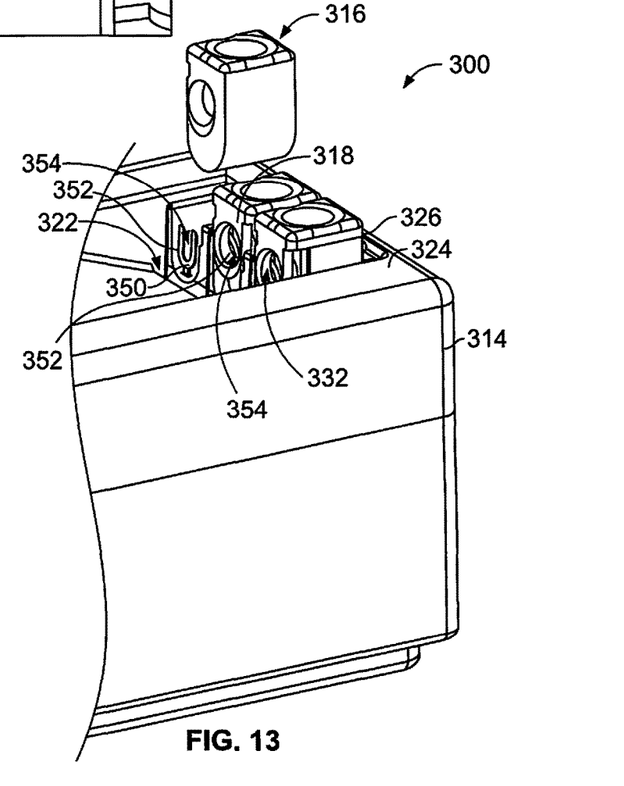
FIG. 13 is a rear perspective view of a power wiring device formed in accordance with an exemplary embodiment.

FIG. 13 is a rear perspective view of a power wiring device 300 that is formed in accordance with an exemplary embodiment. Similar to the power wiring device 200, the power wiring device 300 includes a power connector 316 extending through an opening 322 in a back wall 324 of a rear housing 313 of a power wiring device 300. The power connector 316 defines an insulation displacement contact (IDC) terminal block style connector.

The power connector 316 includes a power connector housing 318 holding a plurality of power terminals 350. The power connector 316 includes a plurality of push buttons 326 having wire channels 332 that receive corresponding wires 304. The push buttons 326 are moveable relative to the power connector housing 318 once the wires 304 are loaded into the wire channels 332, the push buttons 326 may be pushed closed, causing the wires 304 to be pushed into the power terminals 350.

The power terminals 350 include IDC beams 352 that define IDC slots 354. The IDC beams 352 are electrically connected to the conductor of the wire 304 when the wire 304 is pushed closed. The IDC beams 352 may cut through the outer jacket or insulation of the wire 304 to electrically engage the conductor of the wire 304. The IDC slot 354 receives the wire 304.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A power wiring device comprising:
   a front housing having a power component at a user interface;
   a rear housing having a wire interface, wherein at least one of the front and rear housings define a cavity, the rear housing includes a plurality of terminal channels, the rear housing including wire channels open to corresponding terminal channels;
   control electronics received in the cavity, the control electronics including a circuit board and a controller coupled to the circuit board, the controller having control circuitry for controlling a power function of the power wiring device, the power component being coupled to the circuit board and affected by the power function; and
   a plurality of power terminals coupled to the circuit board, the power terminals being held in corresponding terminal channels, the power terminals having a base, circuit board contacts extending from the base and being terminated to the circuit board, and wire contacts extending from the base, the wire contacts having quick connect interfaces for direct, quick connection to corresponding wires of building wiring;
   wherein the wire channels receive ends of the wires of the building wiring to electrically connect to the wire contacts of the power terminals.

2. The power wiring device of claim 1, wherein the quick connect interfaces are poke-in wire interfaces configured to directly receive the wires of the building wiring.

3. The power wiring device of claim 1, wherein each wire contact includes a poke-in arm and a poke-in beam adjacent the poke-in arm, the poke-in beam being deflectable and capturing the corresponding wire between the poke-in arm and the poke-in beam such that the wire contact has multiple contact points with the wire of the building wiring.

4. The power wiring device of claim 1, wherein the power terminals directly electrically connect the wires of the building wiring to the circuit board.

5. The power wiring device of claim 1, wherein the rear housing includes a plurality of terminal channels, the power terminals being held in corresponding terminal channels, the circuit board being coupled to the circuit board contacts and the rear housing to electrically connect the power terminals to the circuit board.

6. The power wiring device of claim 1, wherein the power terminals receive wires from multiple wire channels such that the power terminals electrically connect multiple wires together.

7. The power wiring device of claim 1, wherein the wire channels extend along wire receiving axes, the wire receiving axes being angled transverse to a back wall of the rear housing.

8. The power wiring device of claim 1, wherein each wire contact includes a power-in contact beam and a power-out contact beam, the power-in contact beam being terminated to a first power wire of the building wiring, the power-out contact beam being terminated to a second power wire of the building wiring, the wire contact electrically connecting the first power wire to the second power wire.

9. The power wiring device of claim 1, wherein the rear housing has a top and a bottom, the rear housing holding a first set of the power terminals near the top a second set of power terminals near the bottom, the first and second sets of power terminals being electrically connected to the circuit board, wherein power is routed from either the first set or the second set of power terminals to the other of the first set or second set of power terminals through the circuit board.

10. The power wiring device of claim 1, wherein the front housing is a first front housing of a plurality of interchangeable front housings having different user interfaces, the first front housing defining a power outlet at the user interface configured to receive an AC plug, the power wiring device further comprising a second front housing defining an on/off power switch at the user interface, the power wiring device further comprising a third front housing defining a dimmer power switch at the user interface, wherein each of the first, second and third front housings hold different circuit boards having different power components, and wherein each of the circuit boards are interchangeably matable with the circuit board contacts when the first, second or third circuit board and corresponding first, second or third front housings are selectively mated to the rear housing.

11. A power wiring device comprising:
a front housing having a power component at a user interface;
a rear housing having a wire interface, wherein at least one of the front and rear housings define a cavity;
control electronics received in the cavity, the control electronics including a circuit board and a controller coupled to the circuit board, the controller having control circuitry for controlling a power function of the power wiring device, the power component being coupled to the circuit board and affected by the power function;
a plurality of power terminals coupled to the circuit board, the power terminals having a base, circuit board contacts extending from the base and being terminated to the circuit board, and wire contacts extending from the base, the wire contacts having quick connect interfaces for direct, quick connection to corresponding wires of building wiring; and
a data terminal held by the rear housing, the data terminal being directly terminated to a data wire of the building wiring to receive data signals from the data wire.

12. A power wiring device comprising:
a front housing having a power component at a user interface;
a rear housing having a wire interface with an opening through the rear housing at the wire interface, the front and rear housings defining a cavity;
control electronics received in the cavity, the control electronics including a circuit board and a controller coupled to the circuit board, the controller having control circuitry for controlling a power function of the power wiring device, the power component being coupled to the circuit board and affected by the power function; and
a power connector coupled to the circuit board, the power connector passing through the opening in the rear housing and being positioned at the wire interface for receiving wires of building wiring, the power connector includes a power connector housing holding a plurality of power terminals, the power terminals being coupled to the circuit board, the power terminals having wire contacts including quick connect interfaces for direct, quick connection to corresponding wires of the building wiring.

13. The power wiring device of claim 12, wherein the quick connect interfaces are poke-in wire interfaces configured to directly receive the wires of the building wiring.

14. The power wiring device of claim 12, wherein each wire contact includes a poke-in arm and a poke-in beam adjacent the poke-in arm, the poke-in beam being deflectable and capturing the corresponding wire between the poke-in arm and the poke-in beam, both the boke-in arm and the poke-in beam being electrically connected to the wire.

15. The power wiring device of claim 12, wherein the power terminals directly electrically connect the wires of the building wiring to the circuit board.

16. The power wiring device of claim 12, wherein the power connector housing includes a plurality of terminal channels, the power terminals being held in corresponding terminal channels, the power connector housing including wire channels open to corresponding terminal channels, the wire channels receiving ends of the wires of the building wiring to electrically connect to the wire contacts of the power terminals.

17. The power wiring device of claim 16, wherein the wire channels extend along wire receiving axes, the wire receiving axes being angled transverse to a back wall of the rear housing.

18. The power wiring device of claim 12, wherein each wire contact includes a power-in contact beam and a power-out contact beam, the power-in contact beam being terminated to a first power wire of the building wiring, the power-out contact beam being terminated to a second power wire of the building wiring, the wire contact electrically connecting the first power wire to the second power wire.

19. The power wiring device of claim 12, further comprising a data terminal held by the rear housing, the data terminal being directly terminated to a data wire of the building wiring to receive data signals from the data wire.

20. The power wiring device of claim 12, wherein the power connector includes wire pushers, the wire contacts comprising insulation displacement contact (IDC) beams and an DC slot, the wire pushers pressing the wires into corresponding IDC slots to electrically engage corresponding DC beams.

* * * * *